United States Patent
Purcell et al.

(10) Patent No.: US 8,228,009 B2
(45) Date of Patent: Jul. 24, 2012

(54) TWIN MOTOR ACTUATOR

(75) Inventors: Richard S. Purcell, Corona, CA (US); James G. French, Mission Viejo, CA (US); John I. Shedd, Newport Beach, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 299 days.

(21) Appl. No.: 12/756,868

(22) Filed: Apr. 8, 2010

(65) Prior Publication Data

US 2011/0018482 A1    Jan. 27, 2011

Related U.S. Application Data

(60) Provisional application No. 61/228,687, filed on Jul. 27, 2009.

(51) Int. Cl.
*H02P 1/54* (2006.01)

(52) U.S. Cl. ............ 318/51; 318/34; 318/49; 318/50; 318/53

(58) Field of Classification Search ............ 318/34, 318/49–51, 53, 54
See application file for complete search history.

(56) References Cited

U.S. PATENT DOCUMENTS

| | | | |
|---|---|---|---|
| 4,719,532 A | 1/1988 | Schneider | |
| 4,833,476 A | 5/1989 | Dutcher | |
| 5,781,398 A | 7/1998 | Fenske et al. | |
| 5,991,138 A | 11/1999 | Sklar et al. | |
| 7,310,573 B2 | 12/2007 | Stickling | |
| 7,510,142 B2 | 3/2009 | Johnson | |
| 2001/0027537 A1* | 10/2001 | Nada et al. | 714/23 |
| 2010/0308756 A1* | 12/2010 | Kwang | 318/51 |
| 2011/0254473 A1* | 10/2011 | Pasuri et al. | 318/51 |

* cited by examiner

*Primary Examiner* — Thomas Dougherty
(74) *Attorney, Agent, or Firm* — Renner, Otto, Boisselle & Sklar, LLP

(57) ABSTRACT

A twin motor actuator includes a pair of motor controllers for controlling respective motors according to commands received by each motor controller, and a communication link for communicating the commands received by each motor controller to the other motor controller. The motor controllers are configured to transmit the commands received by the motor controller to the other motor controller via the communication link, determine whether contradictory commands have been received by the motor controllers, and control the motors at a defined state if contradictory commands are received. The communication link is an electrically isolated communication link and the defined state may be the state of the motors immediately before detecting the contradictory commands.

16 Claims, 3 Drawing Sheets

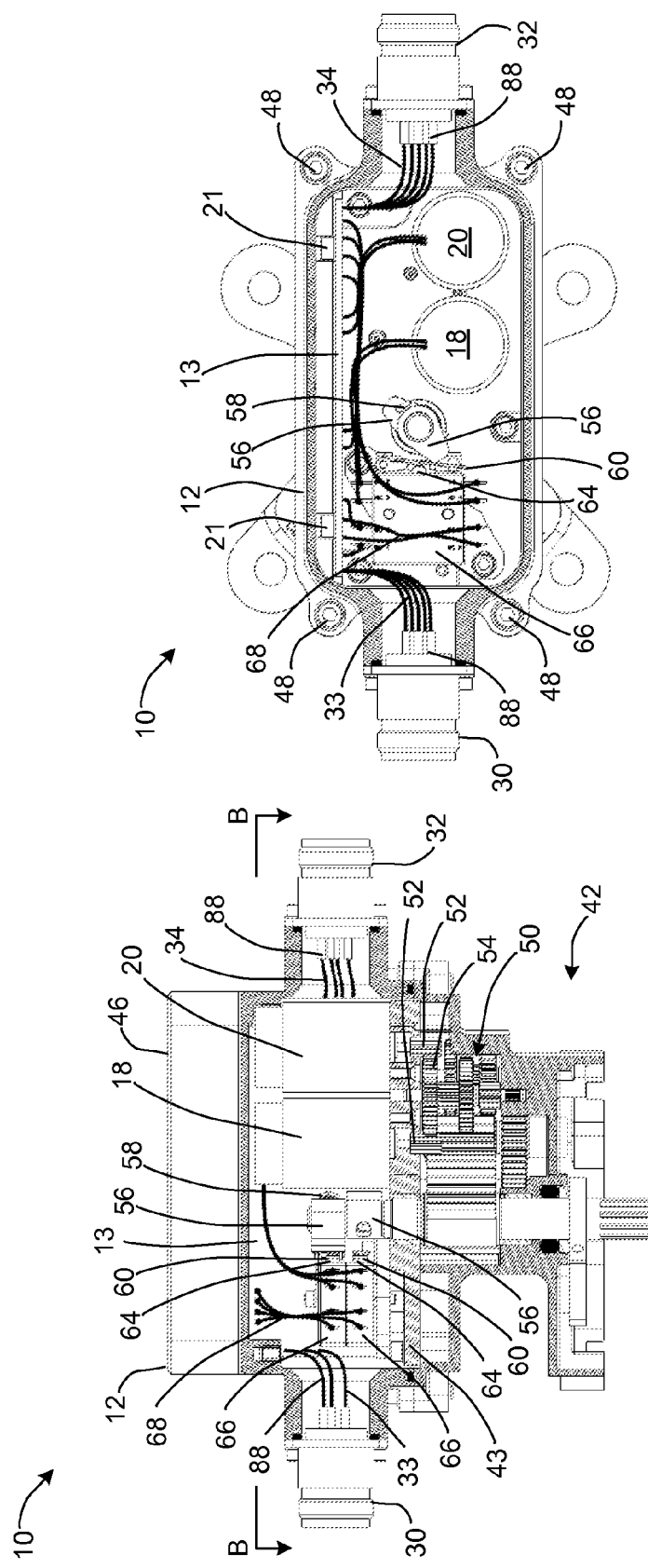

| | I | II | III | IV | V | VI | VII | VIII | IX | X | XI | XII | XIII | XIV | XV | XVI |
|---|---|---|---|---|---|---|---|---|---|---|---|---|---|---|---|---|
| First Motor Controller — Open | 0 | 1 | 0 | 0 | 0 | 0 | 1 | 1 | 0 | 0 | 1 | 0 | 1 | 1 | 1 | 1 |
| First Motor Controller — Close | 0 | 0 | 1 | 0 | 0 | 1 | 0 | 1 | 0 | 1 | 0 | 1 | 0 | 1 | 1 | 1 |
| Second Motor Controller — Open | 0 | 0 | 0 | 1 | 0 | 0 | 1 | 0 | 1 | 1 | 0 | 1 | 1 | 0 | 1 | 1 |
| Second Motor Controller — Close | 0 | 0 | 0 | 0 | 1 | 1 | 0 | 0 | 1 | 0 | 1 | 1 | 1 | 1 | 0 | 1 |
| Commanded State | DS | O | C | O | C | C | O | DF | DF | DF | DF | DF | DF | DF | DF | DF |

DS = Disabled
DF = Defined
C = Closed
O = Open

FIG. 4

TWIN MOTOR ACTUATOR

RELATED APPLICATIONS

This application claims the benefit of U.S. Provisional Application No. 61/228,687 filed Jul. 27, 2009, which is hereby incorporated herein by reference.

FIELD OF INVENTION

The present invention relates generally to the field of motor control electronics, and more particularly to a twin motor actuator having control electronics for resolving conflicting commands.

BACKGROUND

Redundant systems provide multiple components for controlling a particular mechanism so that in the event that one component fails, the redundant component can still be used to control the mechanism. Redundant systems are commonly used in aircraft in which it is highly desirable to have redundancy for safety purposes.

For example, a redundant system can be utilized to control a valve within a fluid system of an aircraft. The system may include two wiring paths from the cockpit to a motor actuator used for controlling the valve. The motor actuator also may include redundant components, such as two motor controllers for commanding two motors independently of one another each powered by separate power supply sources. In the event that any component of the redundant system experiences a failure, the corresponding redundant component can be used to control the valve in accordance with the commands from the cockpit.

Under normal operating conditions, both motor controllers receive the same input commands. In some circumstances, however, it is possible for the system to be damaged such that the motor controllers receive conflicting commands or contradictory (e.g., one motor controller commanded to close the valve and the other motor controller commanded to open the valve). The receipt of contradictory commands can damage the motors and/or cause the motors to oppose each other and stall.

Depending on the relative strengths of the motors, the stronger motor may eventually overtake the weaker motor to control the valve. Predicting which motor will eventually overcome the other, however, is very difficult due to a number of factors, including for example, manufacturing tolerances and variations in wear of the motor components. It is therefore almost impossible to determine whether the valve will be commanded according to the command sent from the cockpit or according to the command that resulted from the electrical fault.

SUMMARY OF INVENTION

The present invention provides a dual motor actuator wherein the motor controllers communicate with each other to resolve contradictory commands. If one or both of the motor controllers determine that contradictory commands have been received, then the motor is controlled to a defined state.

More particularly, according to one embodiment, a motor actuator has a pair of motor controllers for controlling a respective pair of motors according to received commands. The motor controllers are in communication with one another via a communication link. Each motor controller is configured to detect the receipt of contradictory commands, for example, a single motor controller receiving contradictory commands, or the motor controllers being commanded differently from one another.

Each motor controller is configured to transmit its commanded state to the other motor controller via the communication link. The motor controllers compare the received command to the command received by the other motor controller to determine whether the received commands are contradictory. If the received commands are not contradictory, then the motor controllers control the motors in accordance with the received commands, but if the received commands are contradictory, then the motor controllers are configured to control the motors in a defined state.

The defined state may be the state of the motors immediately preceding the detection of contradictory commands or may be a different state, such as a default state or different operational mode.

The communication link between the motor controllers can be an electrically isolated communication link, for example, an electrically isolated communication link that is formed from one or more opto-isolators.

According to another aspect, a method of controlling a twin motor actuator includes receiving a command with a first motor controller for controlling a first motor and receiving a command with a second motor controller for controlling a second motor. The method also includes transmitting the commands received by each motor controller to the other motor controller through a communication link, determining whether the motor controllers have received contradictory commands, and controlling the first motor and the second motor according to the received commands when the commands are not contradictory and controlling the first motor and the second motor to operate in a defined state when the commands are contradictory.

In the exemplary embodiment of an aircraft, the system may include a twin motor controller that is connected to a valve. According to commands transmitted from the cockpit, the valve can be commanded open or closed. If the system is operating properly, an open command transmitted from the cockpit will be received by both motor controllers. Each motor controller will transmit the received command to the other motor controller via the communication link. The motor controllers will then determine if contradictory commands have been received. If both motor controllers received the open command, the motor controllers will command the motors to open the valve.

If a communication route to one of the motor controllers is damaged, for example, the wiring from the cockpit to the first motor controller, then the first motor controller may receive an erroneous command to close the valve. Because the motor controllers are in communication with one another via the communication link, the motor controllers will detect the receipt of contradictory commands (e.g., the motor controllers will detect that one of the motor controllers was commanded closed while the other motor controller was commanded open). The motor controllers will then command the motors to operate in a defined state, for example, the commanded state of the motors immediately preceding the receipt of the contradictory commands, which in this example would be the open state.

Damage to the communication route also could result in the one motor controller being commanded open and closed at the same time. If the motor controller determines that it has received contradictory commands, then the motor controller can be configured to command the motor to a defined state.

The foregoing and other features of the invention are hereinafter described in greater detail with reference to the accompanying drawings.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

FIG. 1 is a cross-sectional view of an exemplary twin motor actuator.

FIG. 2 is a sectional view of the twin motor actuator of FIG. 1 along section lines B-B.

FIG. 4 is a logic table illustrative of the possible command combinations for the motor controllers in a twin motor actuator.

DETAILED DESCRIPTION

Figure 3:
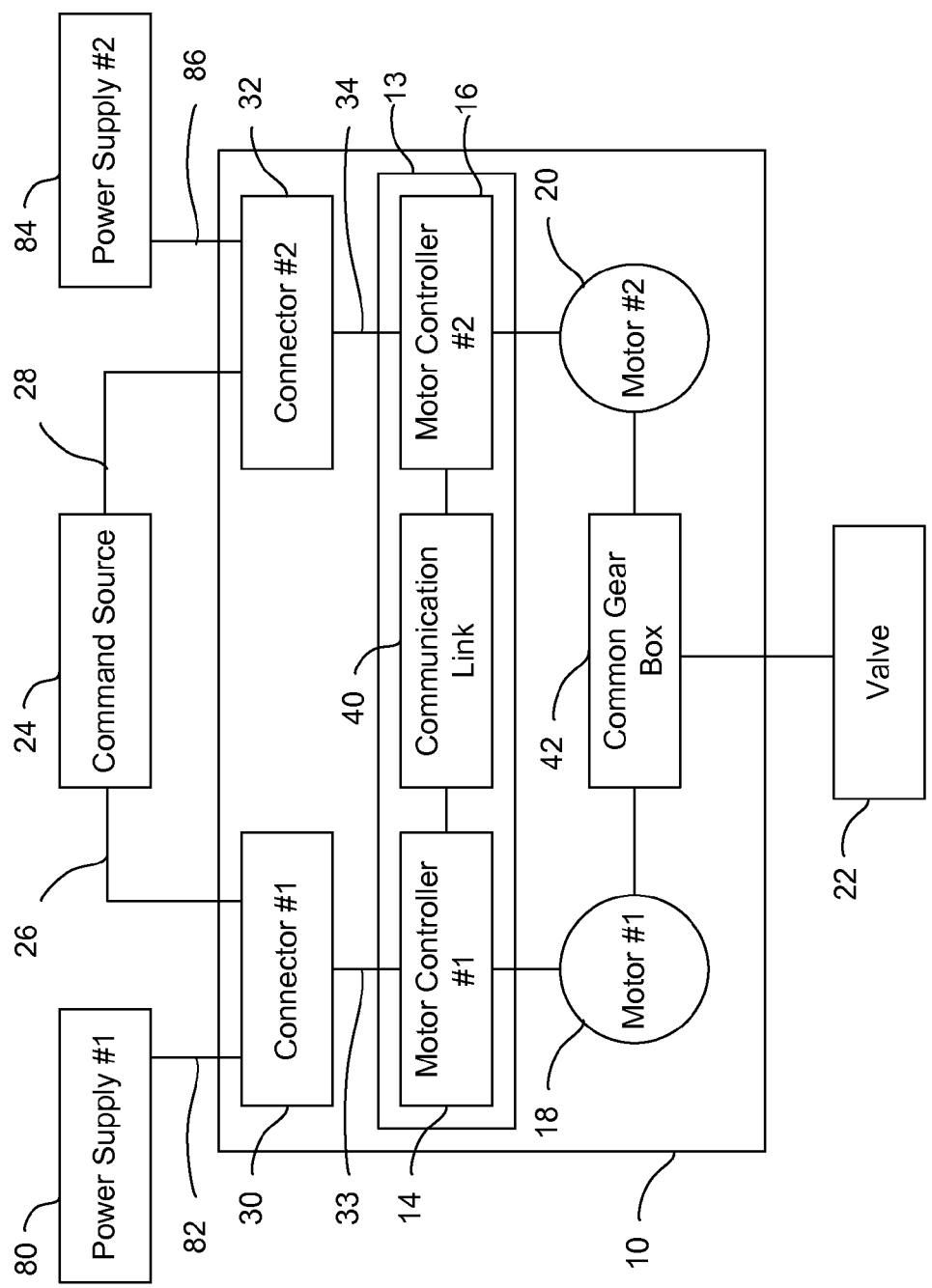
FIG. 3 is an exemplary schematic block diagram a system utilizing a twin motor actuator to control a valve.

Although applicable to a wide variety of systems, the principles of the present invention have particular application to twin motor actuators for controlling valves in a redundant aircraft fluid system, such as fuel system or hydraulic system, and therefore will be described chiefly in this context. It will of course be appreciated, and also understood, that the principles of the invention may be useful in other applications in which multiple motors, including more than two motors, are configured to control the same valve or other component of a system. Referring now in detail to the drawings and initially to FIGS. 1-3, an exemplary actuator, such as a twin motor actuator, is illustrated generally at 10. The actuator 10 includes an outer casing 12 that houses a circuit board 13 that contains a pair of motor controllers 14 and 16 each configured to control respective motors 18 and 20 for operating a valve 22 (FIG. 3). In the embodiment of FIGS. 1 and 2, the circuit board 13 is connected to a side portion of the outer casing 12 by attaching mechanisms 21, such as screws or bolts. It will be appreciated, however, that other configurations and arrangements are possible. For example, the circuit board 13 may be connected to the top of the outer casing 12 or at another location.

The motor controllers 14 and 16 receive commands from an external command source, illustrated schematically at 24 in FIG. 3. The command source 24 may be the cockpit of an aircraft or a flight controller/computer, for example. Critical systems typically are controlled by inputs from a pilot in the cockpit of the aircraft, while non-critical systems often are controlled by a flight controller or flight computer.

The commands from the command source 24 can be transmitted to each motor controller independent of the other motor controller and along the separate communication routes. For example, as shown in FIGS. 1-3, commands from the command source 24 can be transmitted to the actuator 10 via separate communication routes, illustrated schematically in FIG. 3 at 26 and 28. For example, the communication routes may be electrical communication routes, optical fiber communication routes, wireless communication routes, etc. Each communication route is connected to respective connectors 30 and 32 in the actuator 10. The connectors 30 and 32 provide a pathway through the outer casing 12 and are connected to the circuit board 13 through respective communication routes 33 and 34.

As shown schematically in FIG. 3, the circuit board 13 includes a communication link 40. The motor controllers 14 and 16 are in communication with one another via the communication link 40. Through the communication link, each motor controller can transmit its commanded state to the other motor controller for a determination of whether the motor controllers have received contradictory commands.

It is possible for one or both of the communication routes 26 and 28 from the command source 24 to the motor controllers 14 and 16 to be damaged such that the command received by one or both of the motor controllers is different from the command sent by the command source 24. Such damage may be caused, for example, by an electrical short, a break in the communication route, interference, or other damage to the communication route. By providing the communication link 40 between the motor controllers and by transmitting the commands received by each motor controller to the other motor controller, the damage to the communication route can be detected and the motors can be controlled in a defined state rather than in opposition to one another.

For some applications, it may be desirable to maintain electrical isolation between the motor controllers 14 and 16, for example, to eliminate or reduce the effects of electrical and/or magnetic noise, feedback or crosstalk between the motor controllers. The communication link 40 therefore may use optical isolation techniques, for example, by using one or more opto-isolators between the motor controllers to electrically isolate the motor controllers from one another. The system may include one opto-isolator for each command input that is transmitted from one motor controller to the other. Thus, if each motor controller has two inputs, the communication link would have four opto-isolators so that each transmission from the first motor controller to the second motor controller is optically isolated.

The communication link 40 may use other forms of isolation to electrically isolate the motor controllers from one another. For example, the electrical isolation can be provided by capacitive isolation, inductive coupling, current sensing, Hall Effect sensing, or another isolation technique.

As mentioned above, the motor controllers 14 and 16 control respective motors 18 and 20. The motors 18 and 20 are connected to a common gear box 42, which includes an output shaft 44 for controlling the valve 22. The motors may be bidirectional motors which rotate the output shaft 44 clockwise or counterclockwise to open or to close the valve in accordance with the commands received from the command source 24. It should be appreciated that the principles described herein are not limited to bidirectional motors but rather are equally applicable to different types of motors, including, for example, motors for controlling a modulated valve or other component.

As seen in FIGS. 1 and 2, the outer casing 12 can be a multi-piece housing including the gear box 42 which may be preassembled to a center plate 43 and attached to a cover portion 46 by bolts 48. Preferably, the outer casing 12 is environmentally or hermetically sealed.

The gear box 42 includes an arrangement of gears 50 that provides gear and/or speed reduction (although in some applications, the arrangement of gears may be a speed or gear multiplier) and/or torque amplification. Each motor 18, 20 includes a respective pinion 52 that meshes with the input gear 54 of the gear box 42.

The output shaft 44 is suitably journaled in the gear box 42 and connected to respective cams 56. The cams are connected to the output shaft by a connecting mechanism 58, such as a screw. The cams 56 can be configured to engage respective cam followers 60 to contact respective plungers 64 of limit switches 66 thereby providing end of stroke power removal and position feedback to the controllers 14 and 16. The feedback may be provided by a medium for the transmission of signals, for example, communication route 68. Although illustrated as having respective pairs of cams, cam followers, plungers and limit switches, it will be appreciated that other arrangements are possible. Additionally, some or all of the components can be combined with one another.

Each motor controller 14, 16 is operable to control each respective motor 18, 20 in accordance with the received commands. The motors can be configured to control the valve simultaneously with one another such that output shaft 44 is rotated by both motors at the same time to open/close the valve 22. The motors also can be configured to operate sequentially such that only one motor may be powered to control the valve 22 at a given time. In such an arrangement, one of the motors may be the primary motor and the other motor may be a secondary or backup motor which is only activated as needed. For example, the secondary motor controller may only be powered to control the secondary motor if the primary motor controller receives contradictory commands.

As shown in FIG. 3, power is supplied to the first motor controller 14 by a first power supply 80 via communication route 82 and connector 30. Likewise, power is supplied to the second motor controller 16 by a second power supply 84 via communication route 86 and connector 32. The power supplies 80 and 84 are separate from one another to provide redundancy to the actuator 10 such that in the event of the failure of one power supply to one motor controller, the other power supply can still provide power to the other motor controller to control operation of the valve 22.

Although FIG. 3 illustrates respective separate communication routes 26, 28, 82 and 86 between connectors 30 and 32, the power supplies 80 and 84 and the command source 24, it will be appreciated that the communication routes from the power supply and the command source may be fully or partially bundled into a single harness. For example, the communication route 82 from the first power supply 80 to the first connector 30 and the communication route 26 from the command source 24 to the first connector 30 may be partially or fully combined in a single harness that travels along a first path, and the communication route 86 from the second power supply 84 and the communication route 28 from the command source 24 to the second connector 32 may be combined in a second harness that travels along a second path.

The connectors 30 and 32 may be plug type connectors that provide a connection between the actuator 10 and the command source 24 and the power supplies 80 and 84. As best shown in FIGS. 1 and 2, each connector 30, 32 has a number of pins 88 for receiving the commands transmitted from the command source 24. The connectors can be configured such that each pin 88 receives an input command from the command source 24. For example, each motor controller 14, 16 may include two discrete inputs for controlling the motor, one input for commands to open the valve (e.g., clockwise operation of the motor) and one input for commands to close the valve (e.g., counterclockwise operation of the motor). Thus, commands for opening the valve 22 can be received on one pin, and commands for closing the valve 22 can be received on a different pin. It will be appreciated that the open and close command can also be received on the same pin. Additional pins can be used to transmit power from the power supply to the motor controller. Additionally, the connectors may have other pins, for example, for receiving other commands for controlling the valve, for providing feedback to the cockpit, or for other purposes.

As described above, the commands received by the first motor controller 14 may not be the same as the commands received by the second motor controller 16. The motor controllers are in communication with one another via the communication link 40, and the commands received by each motor controller are sent to the other motor controller to determine if the commands are contradictory. If the commands are contradictory, then the motor controllers are configured to command the motors in a defined state and if the commands are not contradictory, the motor controllers command the motors as commanded.

The motor controllers 14 and 16 can be configured to compare the commanded state whenever the commanded state is changed. For example, when the first motor controller is commanded from opened to closed and before controlling the motor to close the valve, the first motor controller can communicate the closed command to the second motor controller via the communication link 40. The first motor controller also can simultaneously receive the commanded position of the second motor controller and compare it to the newly received command. Likewise the second motor controller can be configured to make the same comparison to the commanded state of the first motor controller. In this manner, both motor controllers will detect the existence of contradictory commands as soon as a change in the commanded state occurs.

The motor controllers 14, 16 can be configured to continuously compare the commanded states with one another. The motor controllers also can be configured to compare the commanded states periodically with one another, for example, by sampling the commands in accordance with a predetermined schedule.

In the exemplary environment in which the valve 22 is a fuel valve for an aircraft fuel system, under normal operating conditions, the valve 22 is open to allow fuel to be supplied to the engines. In a redundant system like that shown in FIG. 3, the command to open the fuel valve is transmitted from the cockpit to the actuator 10 along communication routes 26 and 28. If one of the communication routes from the cockpit to the actuator for the fuel valve is damaged, for example, if communication route 26 is damaged as a result of turbulence, fire, unexpected wear, interference, or a failure of any kind, the first motor controller 14 may unexpectedly receive a command to close the valve 22. If the communication route 28 to the second motor controller 16 is undamaged, the second motor controller will continue to be commanded open. Through the communication link 40, the motor controllers 14 and 16 will detect that the first motor controller has received a command that is contradictory to the command received by the second motor controller. Upon the detection of a contradictory command, the motor controllers automatically revert to a defined state, such as the previously commanded state, which in this example is the open state. The valve will therefore remain open despite the receipt of contradictory commands that otherwise would have caused the motor controllers to command the motors in opposition to one another.

It also is possible to program the motor controllers 14 and 16 such that the defined state is a predefined or default state, rather than the previously commanded state. Thus instead of maintaining the valve 22 in an open state, the motor controllers could be configured to automatically close the valve 22. Alternatively, the motor controllers could be configured to automatically open the valve, if that were the desired default position. In addition or as an alternative, the defined state could be a command transmitted from the motor controller to another component of the system, for example, a bypass valve or other component.

In another alternative, the defined state may vary as a function of the detected conflict. For example, the defined state may be an open state when contradictory commands are received by the same motor controller, but the defined state may be a closed state if the first motor controller receives an open command and the second motor controller receives a closed command. As will be appreciated other variations are possible.

The logic table of FIG. 4 is illustrative of the different combinations of commands that may be received by motor controllers in the twin motor actuator described above.

In FIG. 4, each motor controller 14, 16 has two inputs, one for receiving and "open" command and one for receiving a "closed" command. An affirmative command received on one of the inputs is designated with a "1", and a "0" represents that no command has been received. There are sixteen possible command combinations that may be received by the motor controllers and the motor controllers can be programmed to react in response to each detected condition.

In column I, the motor controllers do not receive any command and therefore the commanded state of the motor is a disabled state. This may be, for example, because the actuator is idle or because the power supplies have been turned off.

In columns II-V, one of the motor controllers is in an active state and the other motor controller is in a passive or idle state. For example, the motor controllers may be arranged such that only one motor controller and motor are actively controlling the valve at a given time. In columns II and III, the first motor controller is active and the second motor controller is inactive, and in columns IV and V, the second motor controller is active and the first motor controller is inactive.

In columns II-V, the active motor controller can be configured to determine whether the other motor controller is inactive or has not received a command to open or close the valve. The commanded state of the active motor controller therefore is not contradictory to the commanded state of the inactive motor controller. In such circumstances, the active motor controller assumes control of the valve by commanding the corresponding motor according to the received command.

With respect to columns II-V of FIG. 4, it will be appreciated that the motor controllers also can be configured to detect contradictory commands when one motor controller receives a command and the other motor controller does not receive any command. For example, in column II, the first motor controller is commanded open and the second motor controller has not received a command to open or close. One or both motor controllers may be configured to detect a contradictory command in this situation and then command the motors to operate in a defined state, such as the previously commanded state. Thus, if the system transitions from an operational state in which both motor controllers are commanded open or commanded closed (column VI or VII) to an operational state in which only one motor controller is active (columns II-V), the active motor controller would determine that a single command has been received and the active motor controller will then operate the motor to the commanded state.

Columns VI and VII illustrate the scenario in which both motor controllers are active such that both motors are controlled to open or close the valve at the same time. The commands received by each motor controller are sent to the other motor controller via the communication link. Each motor controller compares the received command to the command of the other motor. When commanded as shown in columns VI and VII, the motor controllers do not detect contradictory commands and each respective motor is commanded in accordance with the commands received from the command source.

Columns VIII and IX illustrate the scenario in which one of the motor controllers is commanded open and commanded closed at the same time and the other motor controller is idle or inactive. When this happens, the commands received by the active motor controller are contradictory. When the motor controller detects the receipt of contradictory commands, it is configured to command the motor in a defined state.

Alternatively, the defined state may be a command to activate the idle motor controller to take over control of the valve. For example, the receipt of simultaneous open and closed commands on the first motor controller (column VIII) may indicate that the communication route to the first motor controller is damaged. The system may therefore shift control of the valve to the second motor controller, and relying on the redundancy of the system, the second motor could assume control of the valve.

In columns X and XI, one motor controller is commanded closed and the other motor controller is commanded open. As described above, the motor controllers each transmit and receive the commanded state of the other motor controller via the communication link. The motor controllers then determine if the commanded states of the motors are contradictory. In the scenario of columns X and XI, both motor controllers detect the existence of contradictory commands. Upon the detection of contradictory commands, the motor controllers operate the motors in the defined state.

In columns XII-XV, the motor controllers receive varying combinations of contradictory commands via communication routes and also at least one of the motor controllers also receives simultaneous open and close commands. For example, in column XII the first motor controller is commanded closed and the second motor controller is commanded both open and closed. In this scenario, the first motor controller and the second motor will detect that the other motor controller has received a contradictory command. Additionally, the second motor controller will detect that it has received contradictory commands. In such circumstances, the motor controllers are configured to command the motors to operate in a defined state.

As described above, the defined state may be the state immediately preceding the detection of contradictory commands or a default state, for example, a commanded open or closed state, or the state of the motor controller that has not received simultaneous contradictory commands.

The defined state also may be customized according to the commands received by the motor controllers. For example, with respect to column XII, both motor controllers are commanded closed and the second motor controller has also received an open command. The defined state may be the common command received by both motor controllers, which in column XII would be the closed state. As described above, the defined state may be a function of the detected conflict.

If both motor controllers receive simultaneous open and closed commands, as shown in column XVI, then the motor controllers can be configured to operate the motors in the defined state, as described above.

Although described primarily in the context of a controlling a fuel valve for an aircraft fuel system, the principles described herein can be applied to other systems as well, including, for example, systems that utilize a motor controller for controlling multiple motors with a common gear train and/or systems which utilize redundancy for the control of components. For example, the principles described herein can be applied to a motor controller that modulates a motor, such as a brushless motor for a modulated system, a system that controls a solenoid valve, or another system.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A twin motor actuator comprising:
   a pair of motor controllers for controlling respective motors according to commands received by each motor controller; and
   a communication link for communicating the commands received by each motor controller to the other motor controller;
   wherein each motor controller is configured to:
   transmit the commands received by the motor controller to the other motor controller via the communication link,
   determine whether contradictory commands have been received by the motor controllers, and
   control the motors in a defined state if contradictory commands are received.

2. The twin motor actuator of claim 1, wherein the communication link is an electrically isolated communication link.

3. The twin motor actuator of claim 2, wherein the electrically isolated communication link is comprised of at least one opto-isolator.

4. The twin motor actuator of claim 1, further comprising a pair of motors, wherein one motor is controlled by one motor controller and the other motor is controlled by the other motor controller.

5. The twin motor actuator of claim 4, wherein the pair of motors are connected to a valve.

6. The twin motor actuator of claim 5, wherein the pair of motors are connected to an output shaft coupled to the valve.

7. The twin motor actuator of claim 6, wherein the motors rotate the output shaft to control a valve.

8. The twin motor actuator of claim 4, wherein the motors are bidirectional motors.

9. The twin motor actuator of claim 5, wherein the motors operate to simultaneously control the valve.

10. The twin motor actuator of claim 1, wherein at least one of the motor controllers is configured to determine whether contradictory commands have been received by determining when the motor controller has received conflicting commands.

11. The twin motor actuator of claim 1, wherein the motor controllers are configured to determine whether contradictory commands have been received by determining when each motor controller has received a command that conflicts with the command received by the other motor controller.

12. The twin motor actuator of claim 1, wherein the defined state is a commanded state of the motor controllers immediately prior to detecting the contradictory commands.

13. The twin motor actuator of claim 1, wherein the defined state is a default state.

14. The twin motor actuator of claim 1, further comprising a pair of connecters, wherein the commands for one motor controller are transmitted through one connector, and the commands for the other motor controller are transmitted through the other connector.

15. A method of controlling a twin motor actuator comprising:
   receiving a command with a first motor controller for controlling a first motor;
   receiving a command with a second motor controller for controlling a second motor;
   transmitting the commands received by each motor controller to the other motor controller through a communication link;
   determining whether the motor controllers have received contradictory commands; and
   controlling the first motor and the second motor according to the received commands when the commands are not contradictory and controlling the first motor and the second motor to operate in a defined state when the commands are contradictory.

16. The method of claim 15, wherein the determining comprises comparing the commands received by each motor controller to the other motor controller to determine if the commands are contradictory.

* * * * *